(12) United States Patent
Ralea et al.

(10) Patent No.: US 6,959,794 B2
(45) Date of Patent: Nov. 1, 2005

(54) LOW POWER PARKING BRAKE FORCE ADJUSTMENT APPARATUS AND METHOD FOR ELECTRICALLY ACTUATED BRAKE SYSTEMS

(75) Inventors: Mihai Ralea, Boonton Township, NJ (US); Eric Daniel Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 8 days.

(21) Appl. No.: 10/449,199

(22) Filed: May 30, 2003

(65) Prior Publication Data

US 2004/0238299 A1 Dec. 2, 2004

(51) Int. Cl.[7] .................................. B60T 7/10
(52) U.S. Cl. .................. 188/156; 188/158; 188/1.11 L; 188/71.8; 188/196 R; 303/20
(58) Field of Search ............................... 188/156–165, 188/71.5, 181 T, 1.11 L, 1.11 E, 1.11 R, 188/106 P, 106 R, 71.8, 71.1, 106 F, 196 R, 188/71.9; 303/20, 3, 15, 115.2, 191, 155, 303/61, 122.04; 244/111; 318/14, 563, 646, 318/362; 701/70, 80, 78

(56) References Cited

U.S. PATENT DOCUMENTS

| 6,209,689 | B1 |   | 4/2001 | Bohm |
| 6,296,325 | B1 | * | 10/2001 | Corio et al. ................... 303/20 |
| 6,321,884 | B1 |   | 11/2001 | Balz |
| 6,382,741 | B1 | * | 5/2002 | McCann et al. ............. 303/191 |
| 6,386,645 | B2 | * | 5/2002 | Hackl ............................. 303/3 |
| 6,402,259 | B2 | * | 6/2002 | Corio et al. ................... 303/20 |
| 6,406,102 | B1 |   | 6/2002 | Arnold |
| 6,460,943 | B1 | * | 10/2002 | Toepfer et al. ............. 303/155 |
| 6,536,561 | B1 |   | 3/2003 | Keller |
| 2002/0117892 | A1 |   | 8/2002 | McCann et al. ............. 303/20 |
| 2002/0126007 | A1 | * | 9/2002 | Weant et al. ............... 340/479 |
| 2003/0042802 | A1 |   | 3/2003 | Pierre et al. |
| 2004/0026988 | A1 | * | 2/2004 | Ewinger et al. ............. 303/89 |
| 2004/0238299 | A1 | * | 12/2004 | Ralea et al. ................. 188/156 |

FOREIGN PATENT DOCUMENTS

| DE | 198 41 170 C1 |   | 2/2000 |
| DE | 019841170 C1 | * | 2/2000 |
| DE | 100 21 601 A1 |   | 11/2001 |
| DE | 10230007 A1 | * | 1/2004 |
| FR | 2 841 858 A |   | 9/2004 |
| JP | 3-63328 | * | 3/1991 |
| WO | 02/46016 A1 |   | 6/2002 |
| WO | 2004/022394 A | | 3/2004 |
| WO | WO 2004/108493 A1 | * | 12/2004 |

OTHER PUBLICATIONS

International Search Report for International Application No. PCT/US2004/016699, Aug. 10, 2004.
Written Opinion of the International Search Authority for International Application No. PCT/US2004/016699, Aug. 10, 2004.

* cited by examiner

*Primary Examiner*—Douglas C. Butler
(74) *Attorney, Agent, or Firm*—Renner, Otto, Boisselle & Sklar, LLP

(57) ABSTRACT

A parking brake monitor and adjustment control system controls parking brake operation of an electromechanically actuated brake system which applies a parking brake force to a wheel. The system includes a monitor circuit for producing an output signal which intermittently causes the brake system to readjust the parking brake force applied to the wheel.

18 Claims, 9 Drawing Sheets

LOW POWER PARKING BRAKE FORCE ADJUSTMENT APPARATUS AND METHOD FOR ELECTRICALLY ACTUATED BRAKE SYSTEMS

TECHNICAL FIELD

The present invention relates generally to electromechanical braking systems. More particularly, the present invention relates to an apparatus and method for providing controlled parking brake operation in an electromechanically actuated brake.

BACKGROUND OF THE INVENTION

Electromechanical brake systems are known in the prior art. In such systems, electric motor-driven actuators are used in connection with the operation of the parking brake of a vehicle. Examples of such known systems are presented by the patents to Masayoshi Matsuo et al. U.S. Pat. No. 4,629,043, and Taber et al. U.S. Pat. No. 3,539,038. Furthermore, the use of a solenoid to release the pawl of a parking brake system is disclosed in the prior patent to Fasano U.S. Pat. No. 4,265,345.

One problem in such known systems resides in the difficulty in providing compensation for brake force variations due to external factors such as temperature. Another problem relates to there oftentimes being limited power availability when the vehicle is in a parking brake condition (e.g., the vehicle has been parked and shut down).

In view of the aforementioned shortcomings associated with conventional electromechnical parking brake systems, there is a strong need in the art for a system which compensates for brake force variations due to external factors such as temperature. Moreover, there is a strong need in the art for a system which minimizes power consumption in providing such compensation.

SUMMARY OF THE INVENTION

The present invention provides for low power parking force adjustment by means of brake force monitoring and actuator control that minimizes power consumption from the vehicle power source such as a battery. The system uses a lower power circuit to monitor the force applied to the brake stack, control the primary power to the power brake actuation system and command the brake actuation system to adjust the force whenever the parking brake force exceeds a preset limit.

More particularly, the system monitors the brake force using, for example, force sensors contained in each electromechanical actuator. The system is activated at intervals (regular or irregular) by a sampling timer to minimize power consumption. The level of brake force is compared to a predetermined reference level. Whenever the brake force exceeds the reference level or drops too far below the reference level, the system generates a latched discrete signal that controls the application of power to the actuation system by activating a power control switch. In addition, the system commands the brake actuation controller to adjust the parking brake force via a discrete park command signal. At the conclusion of such adjustment, the system generates a discrete reset signal that removes power to the actuation system and reinitializes the monitoring system.

Accordingly, the present invention offers the advantages of being more accurate and consistent in maintaining parking brake forces under all environmental conditions, and minimizing power consumption by limiting power to the actuation system.

In accordance with a first aspect of the invention, a parking brake monitor and adjustment control system is provided for controlling parking brake operation of an electromechanically actuated brake system which applies a parking brake force to a wheel. The system includes a monitor circuit for producing an output signal which intermittently causes the brake system to readjust the parking brake force applied to the wheel.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with reference to the drawings, wherein like reference labels are used to refer to like elements throughout.

Figure 1:
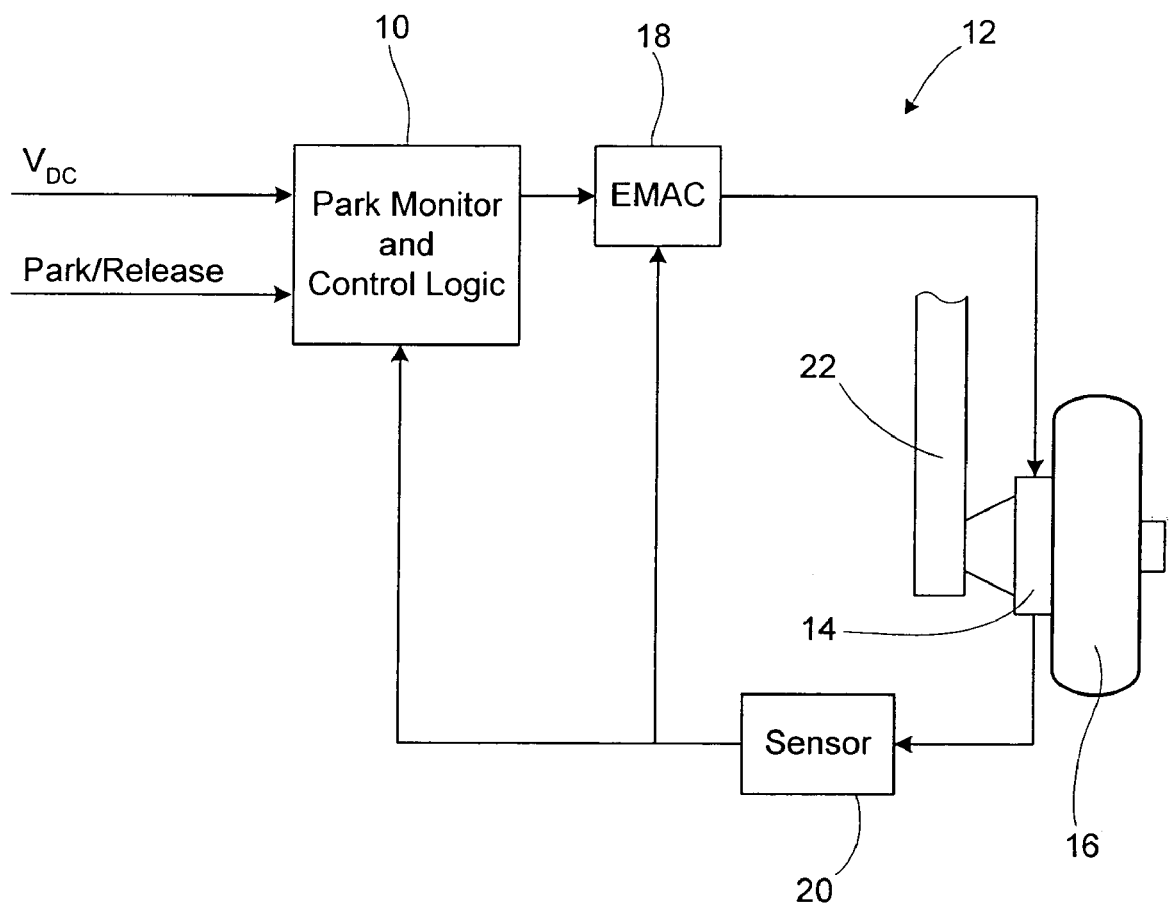
FIG. 1 is a block diagram of a parking brake monitor and adjustment control system for controlling parking brake operation in accordance with the present invention.

Referring initially to FIG. 1, a parking brake monitor and adjustment control system for controlling parking brake operation of an electromechanically actuated brake system is shown. The parking brake monitor and adjustment control system, generally designated 10, monitors and controls a brake system 12. In the exemplary embodiment, the brake system 12 includes one or more electromechanical actuators 14 for applying a parking brake force to one or more wheels 16 of a vehicle.

The brake system 12 further includes an electromechanical actuator controller (EMAC) 18 configured to provide appropriate driving signals to the actuator(s) 14 in response to park and release command signals. In addition, the brake system 12 includes one or more sensors 20 for providing a feedback signal to the control system 10 and/or EMAC 18. As is discussed in more detail below, the sensor 20 may be a force sensor for sensing the amount of parking brake force (e.g., clamping force) exerted by the actuator(s) 14 on the wheel(s) 16. In another embodiment, the sensor 20 may be another type of sensor such as a temperature sensor for sensing the brake temperature.

As described herein in connection with the exemplary embodiment, the control system 10 and brake system 12 provide parking brake operation for a vehicle such as an aircraft. As is shown in FIG. 1, the actuator 14 and wheel 16 are coupled to the strut 22 of an aircraft, which is part of the landing gear assembly. Nevertheless, it will be appreciated that the present invention has utility for virtually any type of vehicle and is not limited necessarily to brake control for aircraft.

Figure 2A:
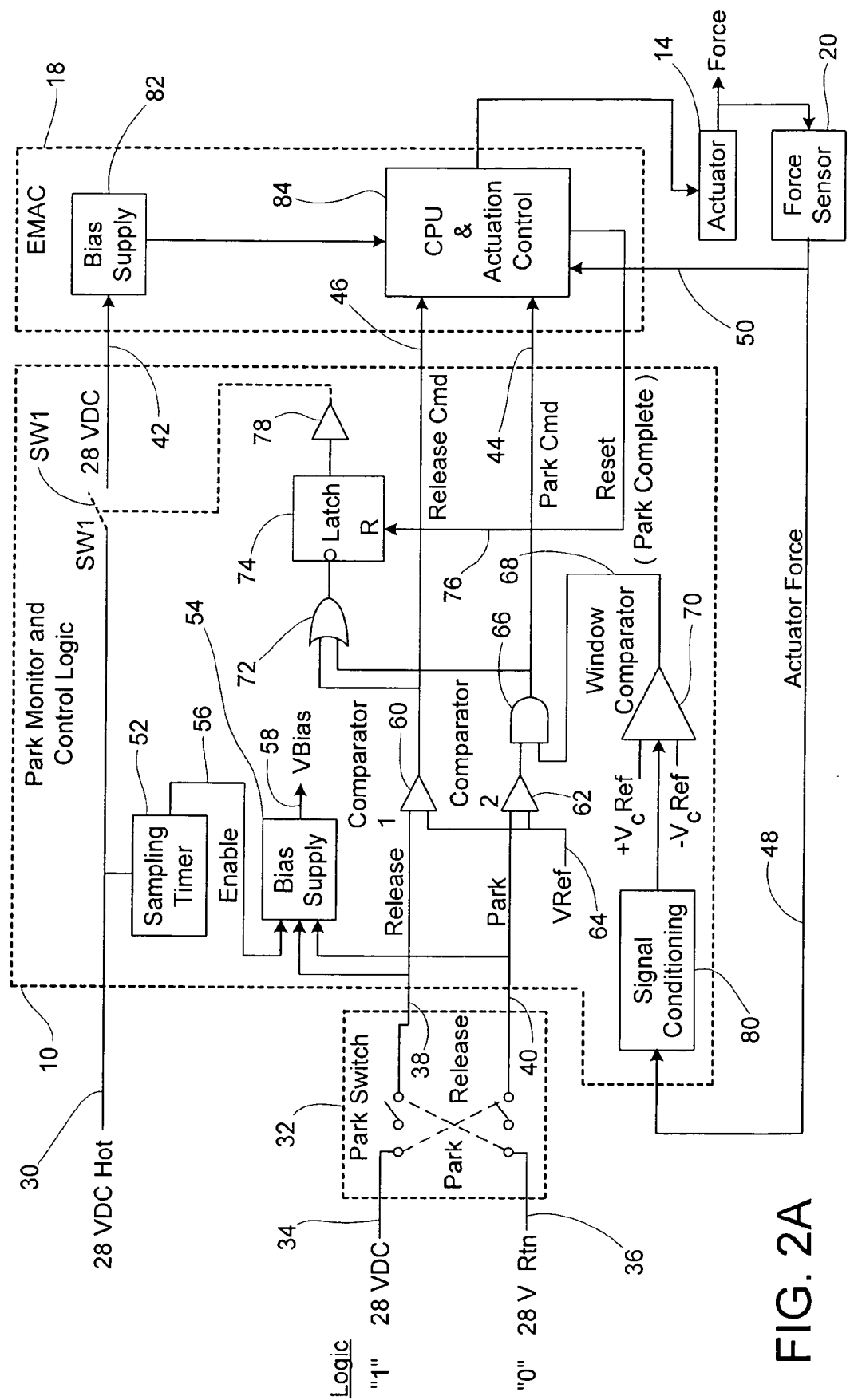
FIG. 2A is a detailed block diagram of a parking brake monitor and adjustment control system in accordance with a first embodiment of the present invention.

Referring now to FIG. 2A, the control system 10 of the present invention is shown in accordance with a first embodiment. The control system 10 receives continuous power for operating the system and for providing power to the brake system 12 via a power line 30. In the case of an aircraft, the power on line 30 may be 28volts (V) dc supplied by a battery within the aircraft. Such battery may be part of the overall power system for the aircraft, or may be dedicated specifically to the brake control. Alternatively, power may be provided from an external power source or the like.

A park switch 32 is provided as shown in FIG. 2A for providing a Park/Release command request to the control system 10. Such switch 32 typically is located in the cockpit of the aircraft. When a pilot wishes to engage the parking brake, the pilot throws the switch 32 into the "park" position. Likewise, when the pilot wishes to disengage or release the parking brake, the pilot throws the switch 32 into the "release" position. As is shown in FIG. 2A, the switch 32 in the exemplary embodiment is a double-pole, double-throw type switch. The poles are coupled to the 28Vdc power source (e.g., battery) and a return ground via lines 34 and 36, respectively. For ease of explanation, the 28 Vdc voltage level in the exemplary embodiment represents a logic "1", or a logic high signal. Similarly, the return ground voltage level (e.g., 0 volts) represents a logic "0", or a logic low signal.

The park switch 32 is a reversing type switch, for example. When the switch 32 is in the "park" position, a logic "0" is input to the control system 10 on line 38 and a logic "1" is input to the control system 10 on line 40. Conversely, when the park switch is in the "release" position a logic "1" is input to the control system 10 on line 38 and a logic "0" is input to the control system 10 on line 40. It will be readily appreciated that other types of switching configurations could be used herein without departing from the scope of the invention.

The control system 10 provides as an output on line 42 power to the EMAC 18. As will be described in more detail below, power is provided to the EMAC 18 only during such time as the parking brake force is being adjusted. In this manner the control system 10 minimizes power consumption to the battery or other external power source. The control system 10 also provides as outputs to the EMAC 18 a "Park Command" signal and "Release Command" signal on lines 44 and 46, respectively. The Park Command signal instructs the EMAC 18 to apply/readjust parking brake force via the actuator 14. The Release Command signal, on the other hand, instructs the EMAC 18 to release parking brake force via the actuator 14.

In this embodiment, the sensor 20 comprises a force sensor 20 for measuring the parking brake clamping force (also referred to herein as "parking brake force") applied to the wheel 16 via the actuator 14 sensor 20, indicative of such measured force, is input to the control system 10 via line 48. In addition, in this embodiment the output of the force sensor 20 is also input to the EMAC 18 via line 50. By monitoring the force applied by the actuator 14, particularly over time as changes in the environment (e.g., temperature, humidity, etc.) occur, the control system can cause the brake system 12 to readjust the parking brake force so as to keep such force within acceptable limits. Such operation will be described in more detail below.

Turning now to the details of the control system 10, the system 10 includes a sampling timer 52 and a bias supply 54. The sampling timer 52 receives constant power from a supply source such as the 28Vdc provided on line 30. The sampling timer 52 is configured to output an enable signal on line 56 at predefined intervals. Such intervals may be periodic or non-periodic. In the exemplary embodiment, the sampling timer 52 causes the enable signal on line 56 to go active after every period Tp. In this case, Tp may equal any amount of time such as a minute, an hour, several hours, etc.

The enable signal on line 56 is input to the bias supply 54 included in the control system 10. The bias supply 54 is configured so as to provide a bias voltage Vbias on line 58 only when the enable signal on line 56 is active. The remaining components included in the control system 10 receive their corresponding operating or supply voltage via the bias voltage on line 58 (such connections not being shown for ease of illustration). Thus, while the enable signal on line 56 is active the various components included in the control system 10 are operational and draw power via the bias voltage on line 58. Conversely, while the enable signal on line 56 is inactive the various components in the control system 10 are primarily non-operational and in a "sleep" mode drawing minimal power. In this manner, the control system 10 consumes very little power while in a "sleep" mode and wakes up only intermittently as controlled by the sleeping timer 52. This minimizes the overall power consumption of the system 10, thus reducing the overall draw from the power source on line 30 (e.g., the battery).

The bias supply 54 also receives an enable signal as a result of being coupled to lines 38 and 40 from the park switch 32. When the pilot changes the park switch 32 from park-to-release, the signal on line 38 goes high which immediately activates the bias supply 54. Thus, operating voltage is immediately applied to the control system 10 in order to perform a release operation. Similarly, when the pilot changes the park switch 32 from release-to-park, the signal on line 40 goes high which immediately activates the bias supply 54. In this manner, operating voltage is immediately applied to the control system 10 in order to perform a park operation. The bias supply 54 is configured to remain active in each of these cases only so long as necessary to complete the parking or release operation upon the change in position of the park switch 32.

As is shown in FIG. 2A, line 38 from the switch 32 is input to the non-inverting input of a comparator 60. Line 40 from switch 32 is input to the non-inverting input of a comparator 62. A voltage reference Vref on line 64 is input to the inverting inputs of comparators 60 and 62. Vref preferably is a voltage approximately in the middle between the logic high voltage on line 34 and the logic low voltage on line 36.

The output of the comparator 60 provides the Release Command signal on line 46. Thus, when the output of the comparator 60 goes high the Release Command signal on line 46 is active and instructs the EMAC 18 to release the parking brake force applied by the actuator 14. The output of the comparator 62 is provided to one input of a two-input AND gate 66. The other input to the AND gate 66 is provided on line 68 which is the output of a window comparator 70 that is included in the control system 10. The output of the AND gate 66 provides the Park Command on line 44. Thus, when the output of the AND gate 66 goes high the Park Command signal on line 44 is active and instructs the EMAC 18 to apply/readjust the parking brake force applied by the actuator 14.

The control system 10 further includes a two-input OR gate 72 which receives as inputs the Park Command and Release Command signals from lines 44 and 46, respectively. The output of the OR gate 72 is coupled to the input of a latch 74. When the output of the OR gate 72 goes to a logic high, i.e., "1", the output of the latch 74 is set high. The output of the latch 74 controls a switch SW1. When the output of the latch 74 is a logic high, the switch SW1 is closed so as to couple the power on line 30 onto line 42 in order to drive the EMAC 18. When the output of the latch 74 is a logic low, the switch SW1 is open thereby disconnecting the power on line 30 from the EMAC 18.

The latch 74 is reset so as to have a logic low output by a reset signal provided on line 76 from the EMAC 18. When the application/readjustment of the parking brake is complete, the EMAC 18 is configured to provide a reset signal on line 76 to indicate the operation is complete. As is shown in FIG. 2A, the switch SW1 may be solenoid driven by a solenoid driver/amplifier 78 included in the control system 10. Again, however, it will be appreciated that other switching configurations may also be used without departing from the scope of the invention.

The control system 10 further includes a signal conditioning circuit 80 which receives the output of the force sensor 20 on line 48. The signal conditioning circuit 80 performs conditioning of the force sensor 20 output signal as is appropriate (e.g., amplifying, filtering, etc.). The conditioned output signal of the force sensor 20 is input to the window comparator 70. Also input to the window comparator 70 are predefined reference voltages +Vcref and −Vcref that define the upper and lower limits, respectively, of the window comparator 70. The window comparator 70 is configured such that when the output signal of the force sensor 20 is within the predefined window (i.e., greater than −Vcref and less than +Vcref), the parking brake force applied by the actuator 14 is acceptable and the output of the window comparator 70 is a logic "0". Conversely, when the output signal of the force sensor 20 is outside the predefined window (i.e., less than −Vcref or greater than +Vcref), the applied parking brake force is unacceptable as being too large or too small and the output of the window comparator is a logic "1".

When the park switch 32 is in the release position, indicating that the parking brake force should not be applied and/or should be released, a logic "1" is input to the control system 10 on line 38 and a logic "0" is input to the control system 10 on line 40. The logic "1" is input to the comparator 60 which in turn causes the output of the comparator 60 to go high. The output of the comparator 60 causes the output of the OR gate 72 to go high, thus setting the output of the latch 74 to a logic "1" or high state. This activates the switch SW1 which in turn causes power from line 30 to be provided to a bias supply 82 included in the EMAC 18. The bias supply 82 in turn provides the necessary operating power to the EMAC 18 and actuator 14 in order to control and drive the actuator 14. Specifically, the output of the bias supply 82 is provided to a central processing unit (CPU) and actuation control circuit 84 which is programmed to carry out conventional processing and actuation control typically associated with an EMAC 18 and actuator 14.

The output of the comparator 60 also causes the Release Command signal on line 46 to go active. This instructs the CPU and actuation control circuit 84 to release parking brake force via the actuator 14. Upon completing the release operation the CPU and actuation control circuit 84 is configured to provide a reset signal to the latch 74 via line 76. As a result, the output of the latch 74 goes low and the switch SW1 is opened so as to remove power to the EMAC 18 and thereby reduce power consumption.

When the park switch 32 is in the park position, indicating that the parking brake force should be applied and/or maintained, a logic "0" is input to the control system 10 on line 38 and a logic "1" is input to the control system 10 on line 40. The logic "1" is input to the comparator 62 which in turn causes the output of the comparator 62 to go high. The output of the comparator 62 causes the input to the AND gate 66 to go high. If the output of the force sensor 20 indicates there is already an acceptable level of parking brake force applied as determined by the window comparator 70, the other input to the AND gate 66 remains low and thus the output of the AND gate 66 remains low.

Conversely, if the output of the force sensor 20 indicates there is an unacceptable level of parking brake force applied, the output of the window comparator 70 goes high and thereby the output of the AND gate 66 goes high. Consequently, the output of the latch 74 goes to a logic "1" or high state. Again this activates the switch SW1 which in turn causes power from line 30 to be provided to the EMAC 18 and actuator 14.

The output of the AND gate 66 also causes the Park Command signal on line 44 to go active. This instructs the CPU and actuation control circuit 84 to apply parking brake force via the actuator 14. Upon completing the park operation the CPU and actuation control circuit 84 is configured to provide a reset signal to the latch 74 via line 76. The CPU and actuation control circuit 84 is configured, for example, to sense the completion of the park operation via the output of the force sensor 20 which is input directly thereto. Alternatively, the circuit 84 may be configured to detect the completion by some other means such as by sensing the load on the actuator, etc. How the circuit 84 detects completion of the park operation can be any conventional manner. Again, upon being reset the output of the latch 74 goes low and the switch SW1 is opened so as to remove power to the EMAC 18 and thereby reduce power consumption.

Figure 2B:
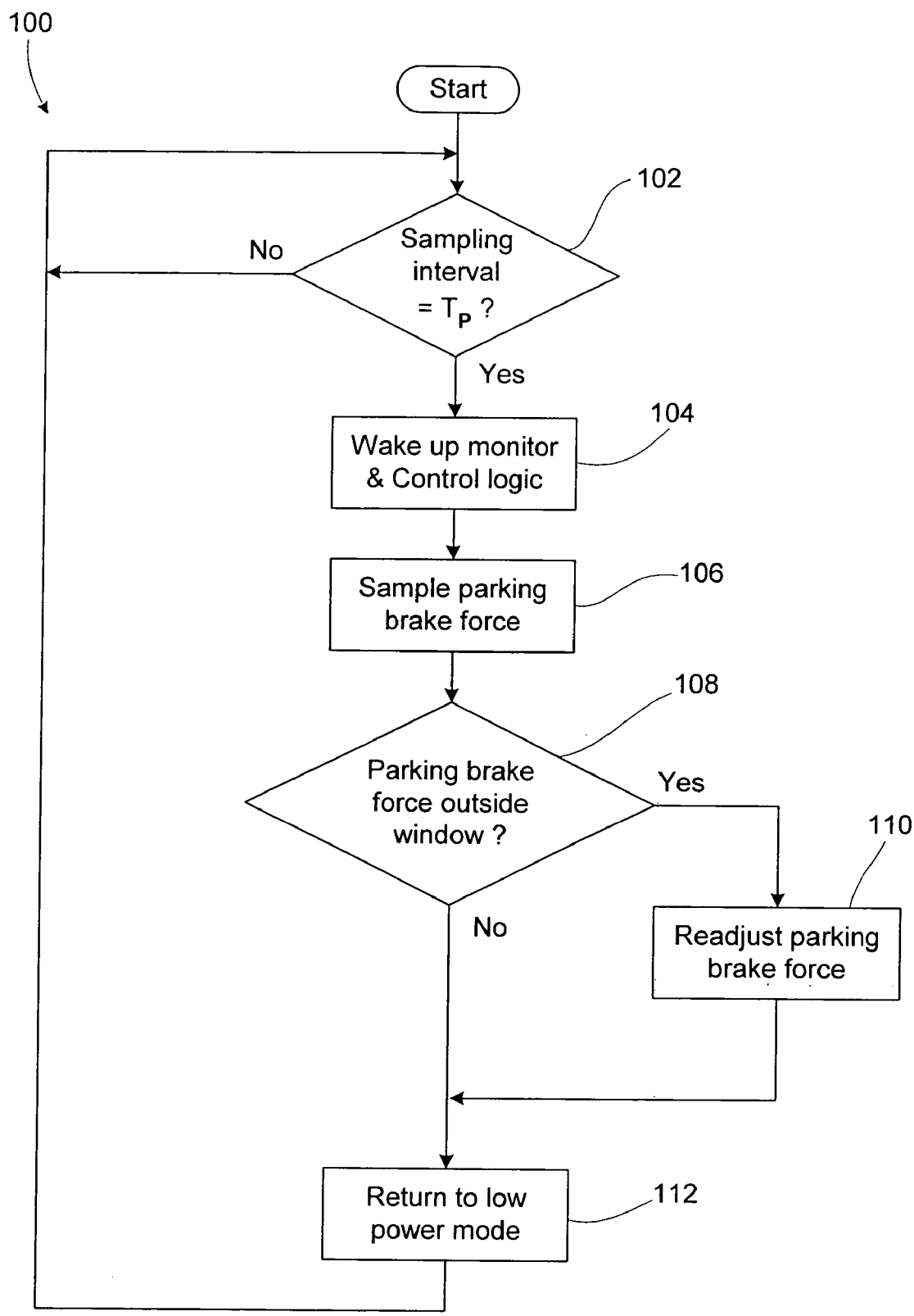
FIG. 2B is a system flowchart illustrating the operation of the system in FIG. 2A in accordance with the present invention.

Turning now to FIG. 2B in conjunction with FIG. 2A, operation of the control system 10 in the park mode following initial switching of the park switch 32 is illustrated by a system operation flowchart 100. Beginning in step 102, the sampling timer 52 determines if time interval Tp has passed since the previous sampling interval. If not, the control system 10 continues to loop around step 102 until such time interval has passed. Upon time interval Tp having passed, the control system 10 proceeds to step 104 in which the enable signal output of the sampling timer 52 on line 56 goes active thereby temporarily enabling the bias supply 54. As explained above, the enable signal causes the bias supply 54 to output a supply voltage or bias voltage to the remaining circuitry in the system 10 so as to "wake up" the control system 10 for so long as necessary to carry out a brake force monitoring and adjustment as needed.

Next, in step 106 the output of the force sensor 20 is sampled via the signal conditioning circuit 80, thus representing the current parking brake force applied by the actuator 14. As mentioned above, the applied parking brake force may vary over time due to considerations such as environmental conditions (e.g., temperature, humidity, etc.). In step 108 the sampled parking brake force is judged by the window comparator 70 as being outside or within the window of acceptability. If the parking brake force is within the window and therefore acceptable, the output of the comparator 70 is low. As a result, the output of the AND gate 66 remains low and therefore the Park Command signal on line 44 remains inactive. Thus, no adjustment of the parking brake force is carried out. At the same time, since the park switch 32 is in the park position the output of the comparator 60 remains at logic "0". Accordingly, the output of the OR gate 72 remains low and the switch SW1 remains open thereby avoiding unnecessary power consumption by the EMAC 18 and actuator 14.

In the event the sampled parking brake force has become unacceptable as judged by the window comparator 70 in step 108, both inputs to the AND gate 66 are high and the Park Command signal on line 44 becomes active. In addition, the output of the AND gate 66 causes the output of the OR gate 72 to go high thereby setting the latch 74. Accordingly, in step 110 power is applied to the EMAC 18 and actuator 14 via line 42 and the EMAC 18 is instructed to readjust the parking brake force. Upon completion of the parking brake operation, the EMAC 18 resets the latch 74 as described above.

Following steps 108 and 110, the control system 10 returns to a low power mode in step 112, by virtue of the output of the sampling timer 52 returning to an inactive state. Following step 112, the system 10 returns to step 102 in which it remains in a low power mode until the next time interval Tp has passed and the above process is repeated.

Figure 3A:
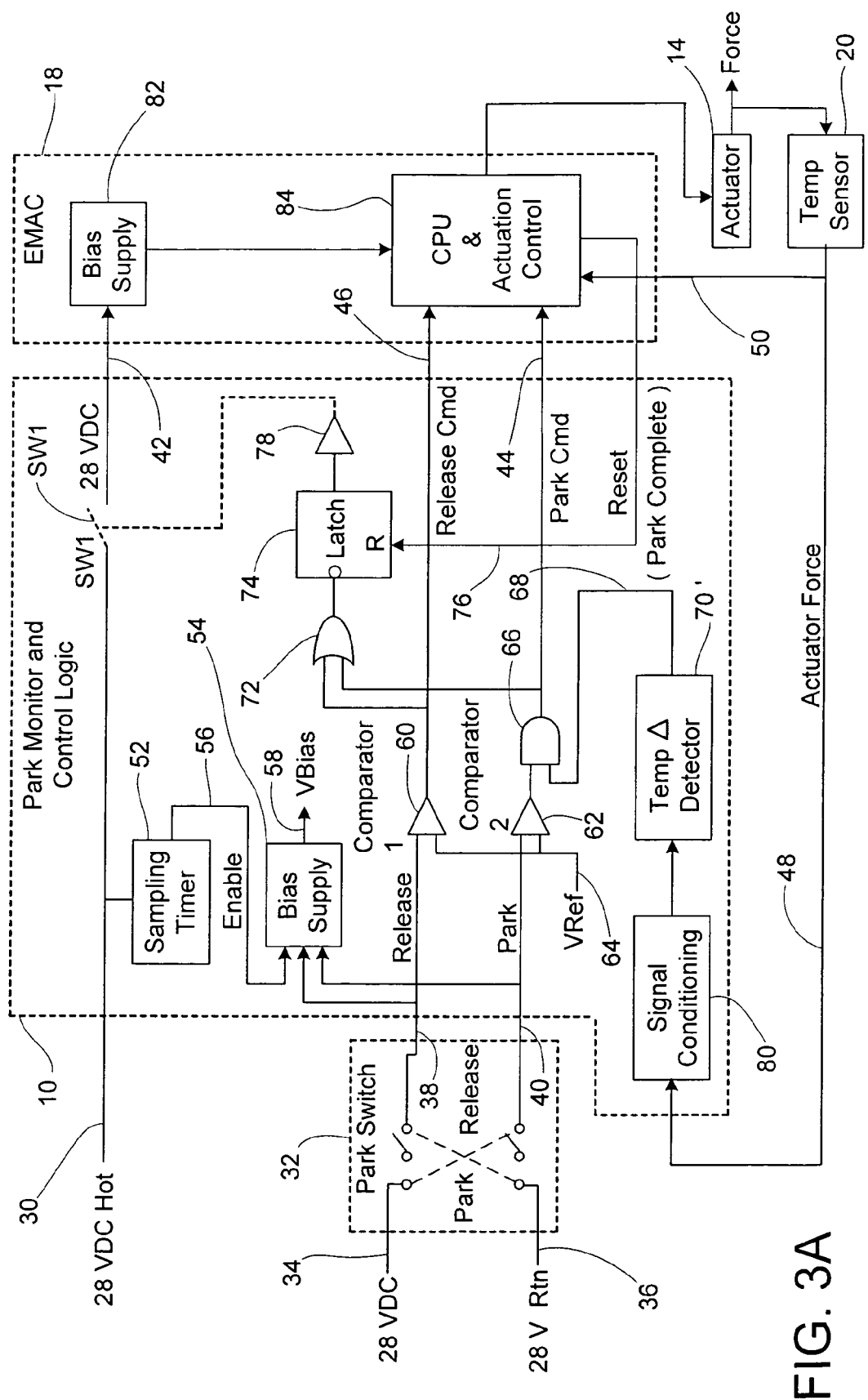
FIG. 3A is a detailed block diagram of a parking brake monitor and adjustment control system in accordance with a second embodiment of the present invention.

FIG. 3A illustrates another embodiment of the control system 10' in accordance with the invention. In this embodiment, the force sensor 20 and window comparator 70 are replaced with a temperature sensor 20' and temperature difference detector 70' in accordance with the invention. As with all of the embodiments discussed herein, many of the same components are utilized in the different embodiments. Accordingly, only the significant distinctions will be discussed herein for sake of brevity.

According to the embodiment of FIG. 3A, the temperature sensor 20' is configured to detect the temperature of the brake system. Such sensor 20' may be located within the housing of the actuator 14 in close proximity to components likely to experience thermal expansion or contraction. As is known, various components within the brake system (e.g. the torque tubes) may expand or contract depending on their temperature. This in turn can affect the brake force applied by the brake system. The invention utilizes detecting a change in such temperature to determine whether or not the parking brake force should be adjusted.

More specifically, the temperature sensor 20' output a signal to the signal conditioner 80 indicative of the current temperature of the brake system. The conditioned temperature signal is input to the temperature difference detector 70'. The temperature difference detector 70' is configured to analyze the whether the temperature has changed by a predetermined amount over a predefined interval. The particular amount and interval are design parameters which may be selected for the particular components of primary concern. Preferably, the amount and interval are selected based on known thermal characteristics of the brake system and how parking brake force is affected thereby.

If the temperature difference detector 70' detects a predetermined change in temperature thereby indicating an unacceptable parking brake force, the output of the temperature difference detector 70' is configured to go high similar to the window comparator 70. If the temperature change detector does not detect such a change, the output of the difference detector 70' remains at a logic low. The remainder of the system 10' operates as described above in relation to the embodiment of FIG. 2A. In this embodiment, however, there is no force sensor signal fed back to the CPU and actuation control 84. The EMAC instead employs other known means to detect the completion of the park brake readjustment (e.g., load sensing, etc.) and subsequently provide the reset signal on line 76.

Figure 3B:
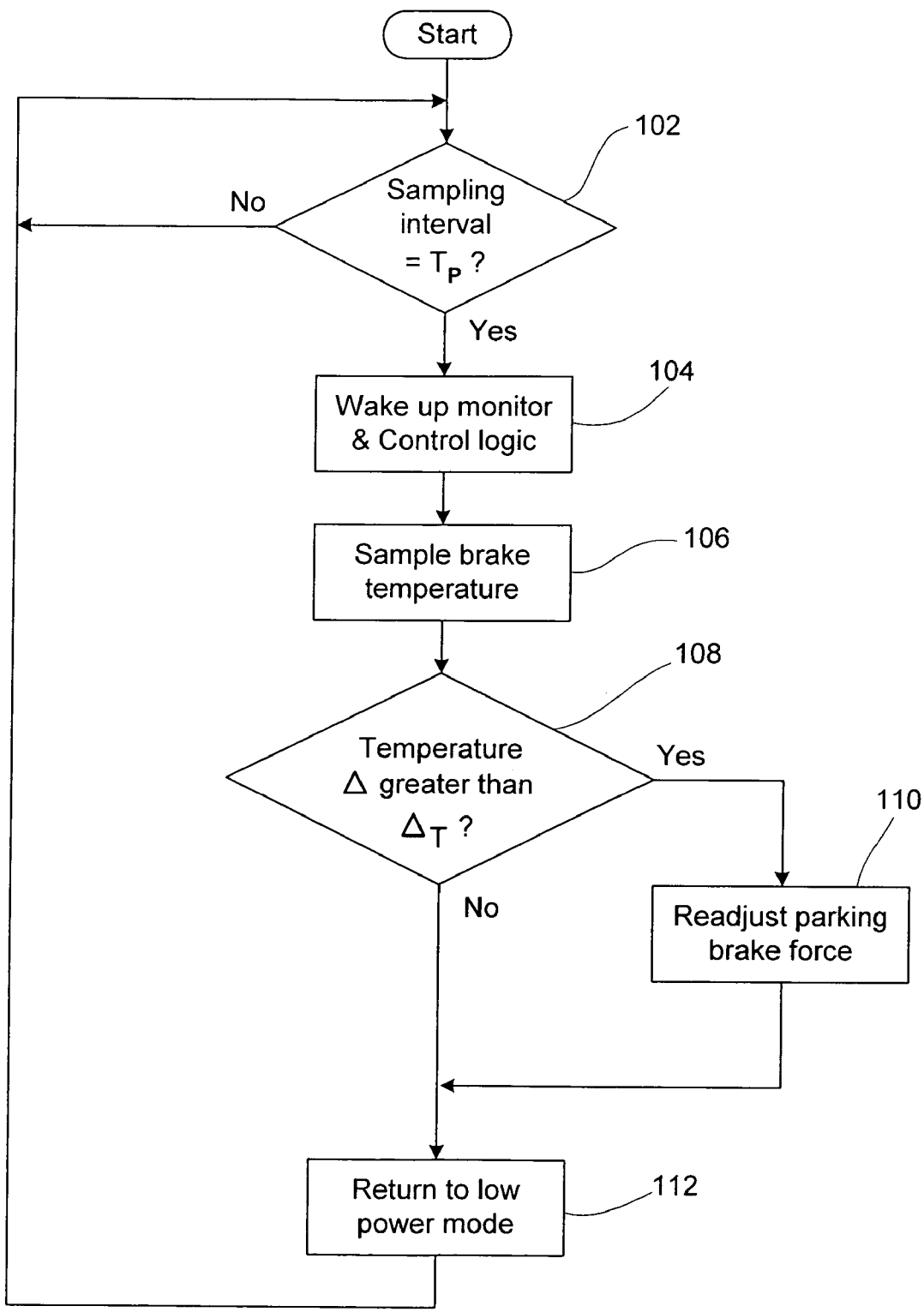
FIG. 3B is a system flowchart illustrating the operation of the system in FIG. 3A in accordance with the present invention.

FIG. 3B illustrates the operation of the control system 10' shown in FIG. 3A. The steps are the same as those discussed in connection with FIG. 2B with the exception that steps 106 and 108 are replaced with steps 106' and 108'. Specifically, in step 106' the current temperature is sampled rather than the applied parking brake force. Similarly, in step 108' the system 10' determines whether the temperature change is within acceptable limits or not. Otherwise, operation is virtually identical between the two embodiments.

Figure 4A:
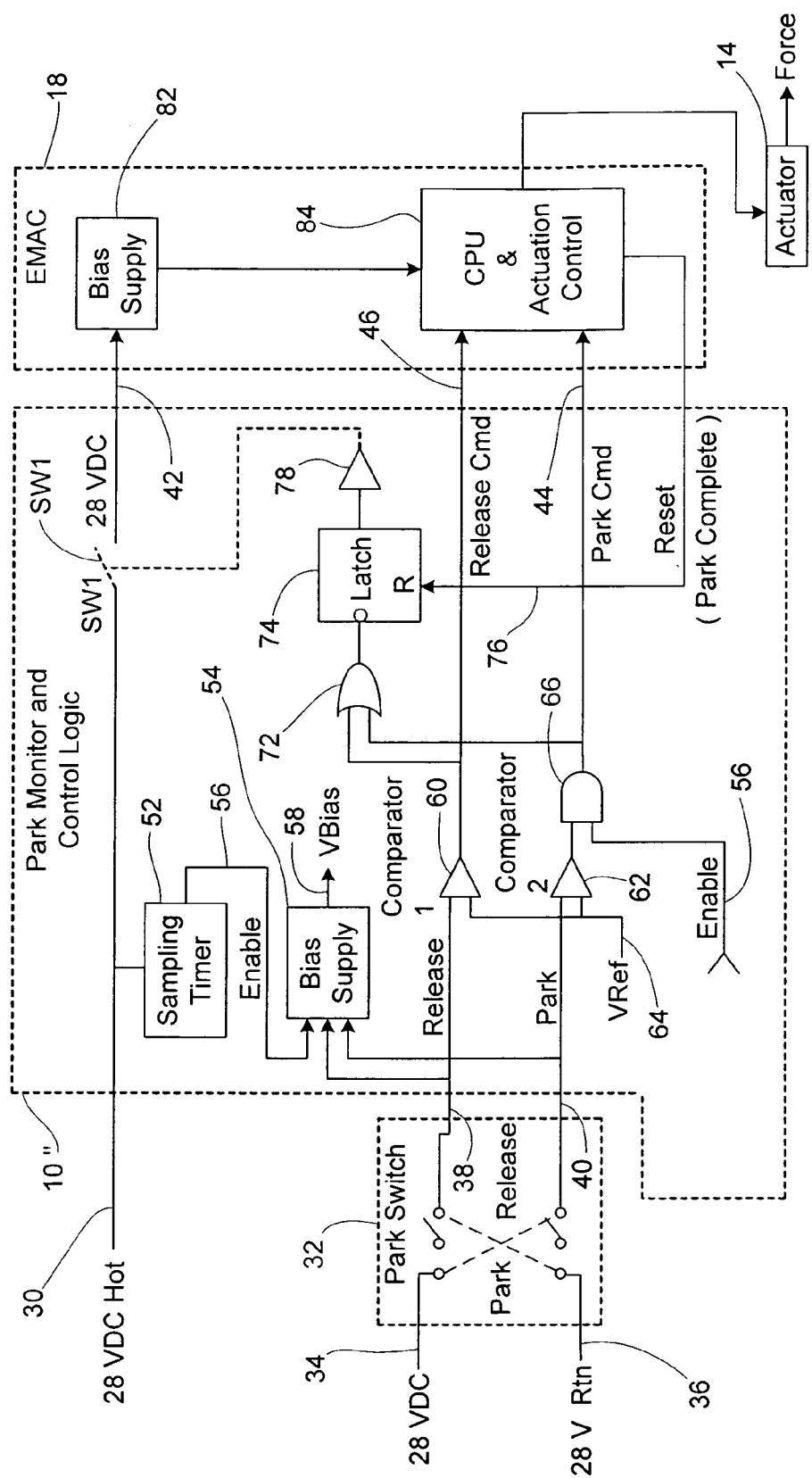
FIG. 4A is a detailed block diagram of a parking brake monitor and adjustment control system in accordance with a third embodiment of the present invention.

Referring now to FIG. 4A, another embodiment of the control system 10' is shown. In this embodiment, open loop control is utilized in the sense there is no feedback signal from the actuator 14. Rather, while in the park mode the system 10' simply wakes up at the particular interval set by the sampling timer 52 and performs a parking brake readjustment regardless of whether such adjustment is needed or not.

Specifically, when the park switch 32 is in the park position the input to the comparator 62 on line 40 is a logic "1" as explained above. The output of the comparator 62 is therefore also a logic "1" as input into the AND gate 66. In order to set the latch 74 only during the desired readjustment periods, the second input of the AND gate 66 is coupled to the enable output signal on line 56 from the sampling timer 56.

Figure 4B:
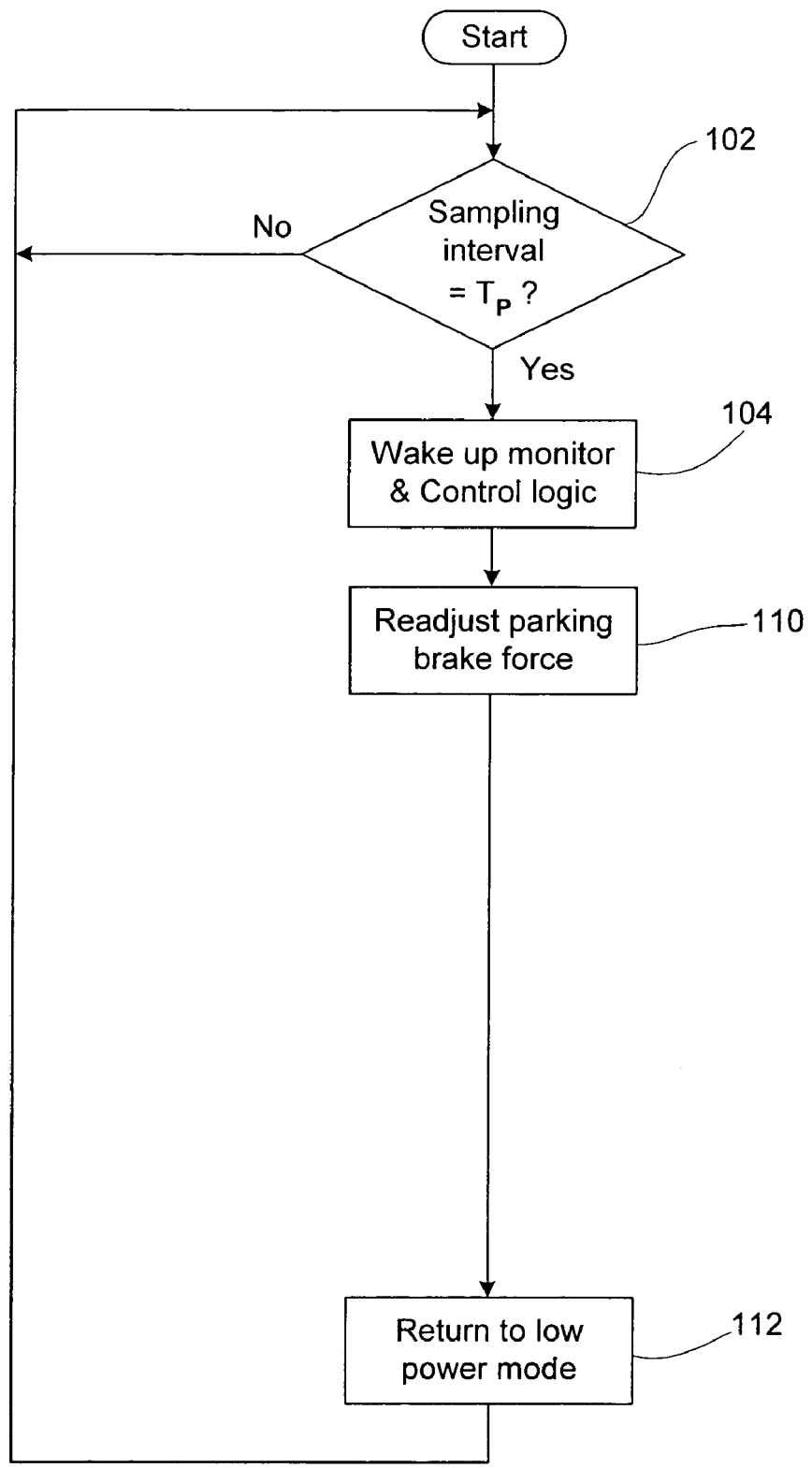
FIG. 4B is a system flowchart illustrating the operation of the system in FIG. 4A in accordance with the present invention.

FIG. 4B illustrates the operation of the control system 10" in accordance with the embodiment of FIG. 4A. The control system 10" operates in the same manner as the system 10 in FIGS. 2A and 2B, with the exception that there is no sampling of the applied braking force and instead the system uses open loop control. Thus, the control system 10" merely includes steps 102, 104, 110 and 112 as illustrated in FIG. 4B.

Figure 5A:
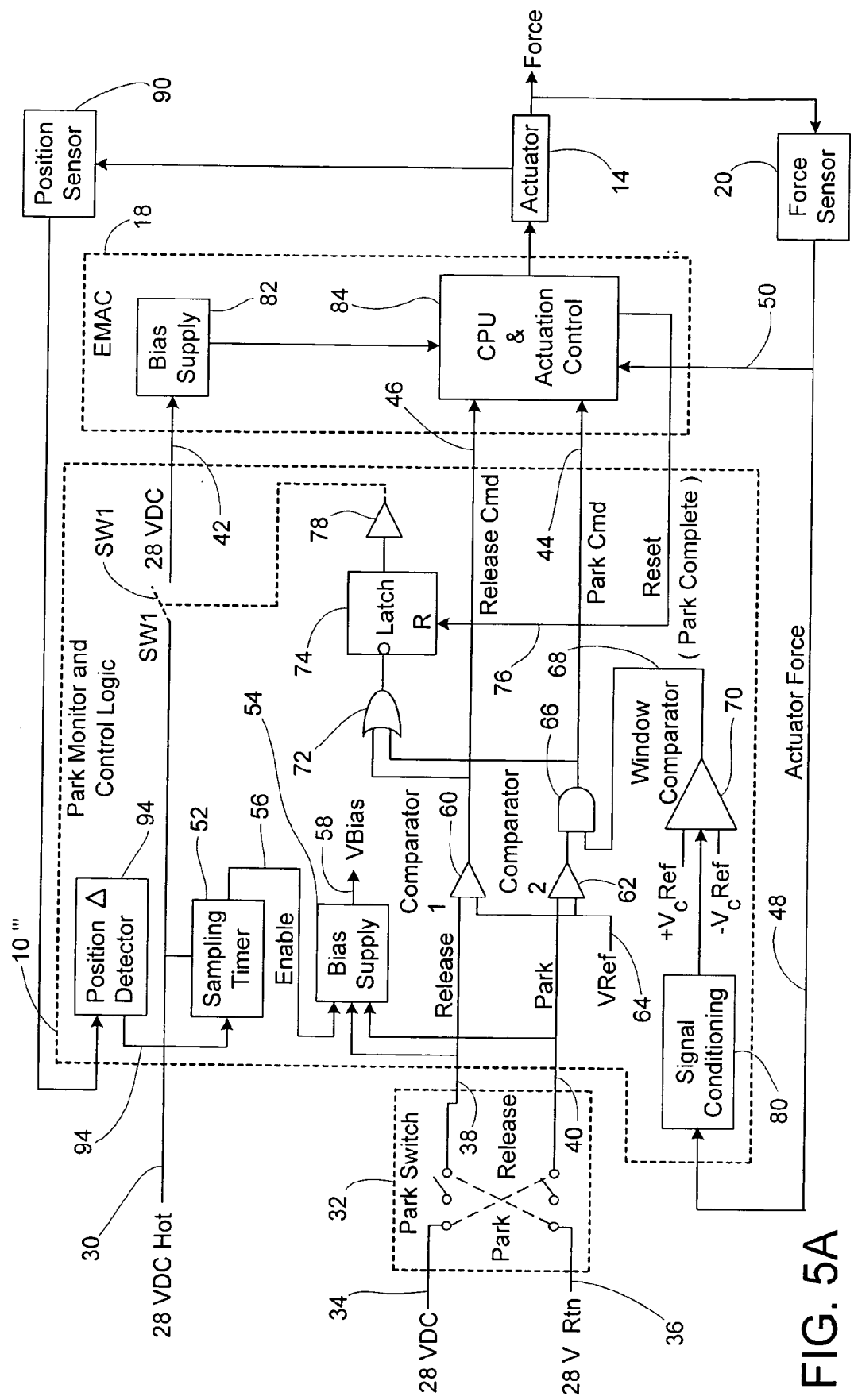
FIG. 5A is a detailed block diagram of a parking brake monitor and adjustment control system in accordance with a fourth embodiment of the present invention.

FIG. 5A illustrates yet another embodiment of the present invention, in this case generally labeled 10'''. The system 10''' is identical in design and operation to the embodiment of FIGS. 2A and 2B, with the following exceptions. The system 10''' further includes a position sensor 90 such as an LVDT which senses the position of the actuator ram within the actuator 14. In addition, the system 10''' includes a position change detector 92 which detects the amount of change in position since a previous sampling interval or intervals.

In this embodiment, the system 10''' monitors the change in actuator position in addition to the parking brake force. If the system 10''' detects that the actuator position has not changed significantly over a particular time interval, the system 10''' assumes that the brake system has stabilized to a steady state. Consequently, the system 10''' increases the particular sampling interval so as to monitor the parking brake force less frequently. As a result, the system 10''' consumes even less power over a given period of time.

As is shown in FIG. 5A, the position sensor 90 provides an output signal to the position change detector 92 which is indicative of the position of the actuator ram. From one sampling interval/parking brake force readjustment to the next, the position change detector 92 determines if the change in position of the actuator ram is less than a predetermined amount. Such predetermined amount can be based on any design criteria for indicating the brake system 12 is in a steady state within the parking brake operation. In the event the detected change in position is less than a predetermined amount, the position change detector 92 output a control signal on line 94 which informs the sampling timer 52 to increase the sampling interval to some maximum sampling interval Tpmax. Such increase may occur gradually in steps with each new sample, or may increase directly to Tpmax as will be appreciated.

Figure 5B:
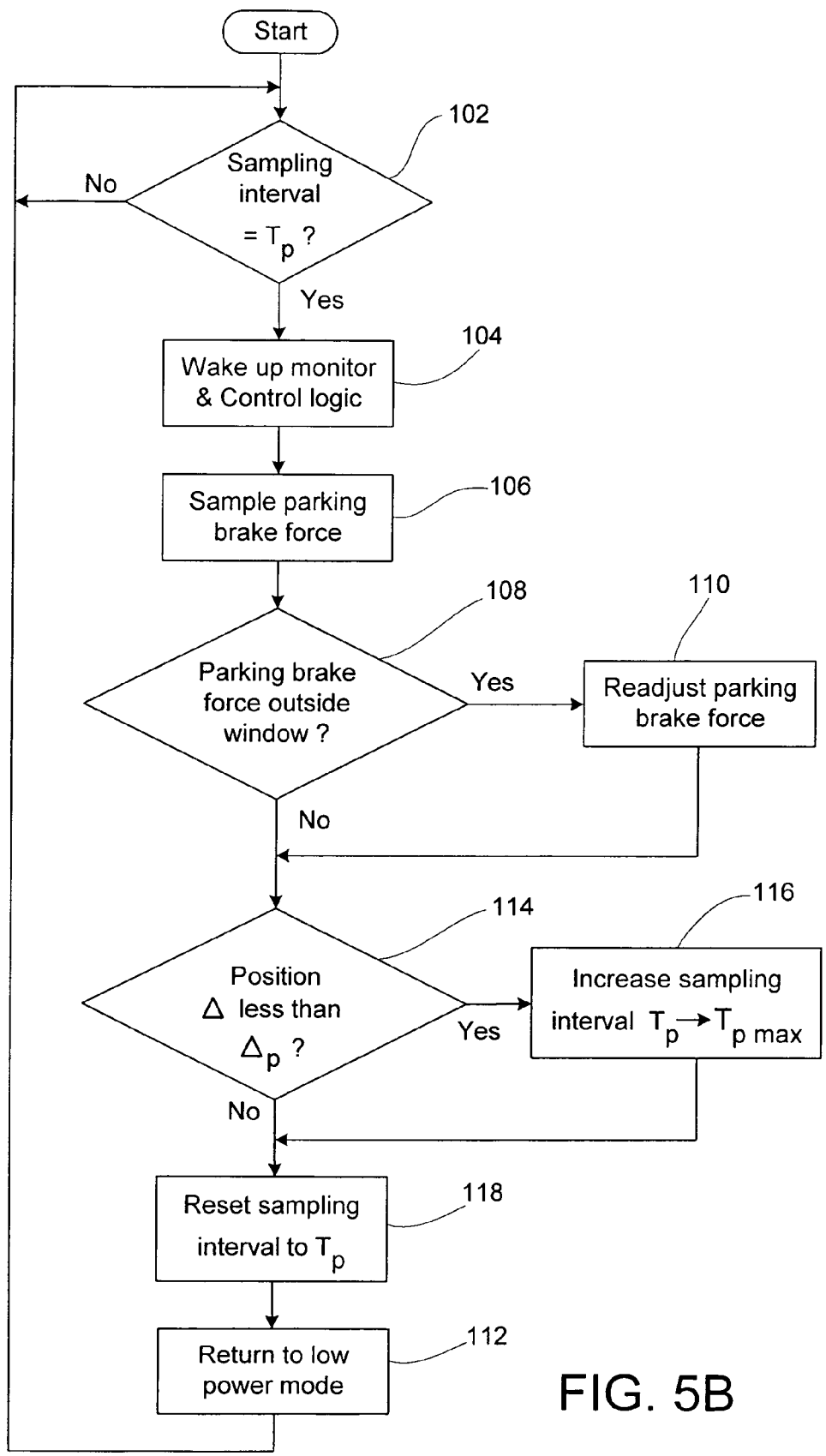
FIG. 5B is a system flowchart illustrating the operation of the system in FIG. 5A in accordance with the present invention.

FIG. 5B illustrates operation of the system 10''' which again is identical with that of the embodiment of FIG. 2B with the exception of the added steps associated with monitoring the position of the actuator 14. More particularly, following steps 108 and 110 the system 10''' determines in step 114 whether the change in position of the actuator 14 since the last interval (or intervals) is less than the predetermined amount. If yes in step 114, the system 10''' proceeds to step 116 in which the position change detector 92 instructs the sampling timer 52 to increase the sampling interval to or towards Tpmax. As a result, the frequency at which the parking brake force is monitored is decreased and power consumption is further reduced.

If in step 114 it is determined that the position of the actuator ram has changed more than the predetermined amount, the system 10''' proceeds to step 118 in which the position change detector 92 instructs the sampling timer 52 to reset the sampling interval Tp back to a minimum time period. Since the position of the actuator ram has changed more than the predetermined amount, it is assumed that conditions have changed and/or the brake system 12 is not in a steady state. Hence, the parking brake force will be readjusted more frequently in order to maintain acceptable parking brake force.

It will be appreciated that the position feedback shown in the embodiment of FIGS. 5A and 5B can be used in combination with any of the above discussed embodiments. In fact, other embodiments may have other combinations as will be appreciated by those having ordinary skill in the art based on the disclosure herein.

The present invention thus provides for low power parking force adjustment by means of brake force monitoring and actuator control that minimizes power consumption from the vehicle power source such as a battery. The system uses a lower power circuit to monitor the force applied to the brake stack, control the primary power to the power brake actuation system and command the brake actuation system to adjust the force whenever the parking brake force exceeds a preset limit.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A parking brake monitor and adjustment control system for controlling parking brake operation of an electromechanically actuated brake system which applies a parking brake force to a wheel of a vehicle, comprising:

a monitor circuit for producing an output signal which intermittently causes the electromechanically actuated brake system to readjust the parking brake force applied to the wheel during such time that the vehicle is parked, wherein the brake system includes a force sensor for sensing an amount of parking brake force applied to the wheel, and wherein the monitor circuit includes:

a comparator for comparing to a predetermined criteria the amount of parking brake force applied to the wheel based on an output of the force sensor; and circuitry for producing the output signal to cause the brake system to readjust the parking brake force applied to the wheel based on the comparison.

2. The control system of claim 1, wherein the monitor circuit is configured to operate primarily in a low power consumption mode, and operates intermittently at a higher power consumption mode to produce the output signal.

3. The control system of claim 2, wherein the monitor circuit includes a timer which causes the monitor circuit to wake up from the lower power consumption mode into the higher power consumption mode.

4. The control system of claim 1, wherein the monitor circuit is configured to operate primarily in a low power consumption mode in which the comparator and circuitry are inactive, and operates intermittently at a higher power consumption mode in which the comparator and circuitry are active to produce the output signal.

5. The control system of claim 4, wherein the monitor circuit further comprises a switching circuit for selectively providing power to the brake system when causing the brake system to readjust the parking brake force applied to the wheel.

6. A parking brake monitor and adjustment control system for controlling parking brake operation of an electromechanically actuated brake system which applies a parking brake force to a wheel, comprising:

a monitor circuit for producing an output signal which intermittently causes the brake system to readjust the parking brake force applied to the wheel, wherein the brake system includes a temperature sensor, and wherein the monitor circuit includes:

temperature change detecting circuitry for detecting a change in the temperature of the brake system based on the temperature sensor, and circuitry for producing the output signal to cause the brake system to readjust the parking brake force applied to the wheel based on the detected change.

7. The control system of claim 6, wherein the temperature change detecting circuitry is configured to detect a change in temperature greater than a predefined amount.

8. The control system of claim 6, wherein the monitor circuit is configured to operate primarily in a low power consumption mode in which the temperature change detecting circuitry and circuitry for producing an output signal are inactive, and operates intermittently at a higher power consumption mode in which the temperature change detecting circuitry and circuitry for producing an output signal are active to produce the output signal.

9. The control system of claim 8, wherein the monitor circuit further comprises a switching circuit for selectively providing power to the brake system when causing the brake system to readjust the parking brake force applied to the wheel.

10. A parking brake monitor and adjustment control system for controlling parking brake operation of an electromechanically actuated brake system which applies a parking brake force to a wheel, comprising:
  a monitor circuit for producing an output signal which intermittently causes the brake system to readjust the parking brake force applied to the wheel,
  wherein the brake system includes a position sensor for sensing a position of a brake actuator included in the brake system for applying the parking brake force to the wheel, and wherein the monitor circuit includes:
  position change detecting circuitry for detecting a change in the position of the brake actuator following a previous readjustment based on the position sensor, and
  circuitry for altering, based on the detected change, intervals at which the monitor circuit intermittently causes the brake system to readjust the parking brake force applied to the wheel.

11. The control system of claim 10, wherein the monitor circuit is configured to operate primarily in a low power consumption mode, and operates intermittently at a higher power consumption mode to produce the output signal.

12. The control system of claim 11, wherein the monitor circuit includes a timer which causes the monitor circuit to wake up from the lower power consumption mode into the higher power consumption mode.

13. The control system of claim 12, wherein the circuitry for altering is configured to alter a timing period of the timer.

14. The control system of claim 13, wherein the timing period is increased relative to the change in position decreasing.

15. The control system of claim 13, wherein the timing period is decreased relative to the change in position increasing.

16. A method for controlling parking brake operation of an electromechanically actuated brake system which applies a parking brake force to a wheel of a vehicle, the method comprising the steps of:
  producing an output signal which intermittently causes the electromechanically actuated brake system to readjust the parking brake force applied to the wheel during such time that the vehicle is parked,
  wherein the brake system includes a force sensor for sensing an amount of parking brake force applied to the wheel, and wherein the method includes the steps of:
  comparing to a predetermined criteria the amount of parking brake force applied to the wheel based on an output of the force sensor; and
  producing the output signal to cause the brake system to readjust the parking brake force applied to the wheel based on the comparison.

17. The method of claim 16, further comprising the steps of operating primarily in a low power consumption mode, and operating intermittently at a higher power consumption mode to produce the output signal.

18. The method of claim 17, further comprising employing a timer to wake up from the lower power consumption mode into the higher power consumption mode.

* * * * *